United States Patent [19]

Behmann

[11] Patent Number: 5,254,253
[45] Date of Patent: Oct. 19, 1993

[54] MODULAR SHIPBOARD MEMBRANE BIOREACTOR SYSTEM FOR COMBINED WASTEWATER STREAMS

[75] Inventor: Henry Behmann, Puslinch, Canada

[73] Assignee: Zenon Environmental Inc., Burlington, Canada

[21] Appl. No.: 934,879

[22] Filed: Aug. 21, 1992

Related U.S. Application Data

[63] Continuation-in-part of Ser. No. 794,867, Nov. 19, 1991, Pat. No. 5,151,187.

[51] Int. Cl.$^5$ .............................. C02F 1/44; C02F 3/12
[52] U.S. Cl. .................... 210/607; 210/625; 210/626; 210/629; 210/151; 210/195.2; 210/195.3; 210/205; 210/220
[58] Field of Search ............... 210/607, 620, 623, 625, 210/626, 629, 631, 151, 195.2, 195.3, 202, 205, 220, 257.3, 258, 259, 295

[56] References Cited

U.S. PATENT DOCUMENTS

| | | | |
|---|---|---|---|
| 3,269,542 | 8/1966 | Renzi et al. | 210/151 |
| 3,773,659 | 11/1973 | Carlson et al. | 210/151 |
| 3,941,692 | 3/1976 | Gutnick et al. | 210/611 |
| 3,959,124 | 5/1976 | Tchobanoglous | 210/625 |
| 4,071,445 | 1/1978 | Kakayama et al. | 210/151 |
| 4,207,180 | 6/1980 | Chang | 210/629 |
| 4,440,645 | 4/1984 | Kite | 210/626 |
| 4,705,633 | 11/1987 | Bogusch | 210/629 |
| 4,861,471 | 8/1989 | Nakao et al. | 210/195.3 |
| 5,151,187 | 9/1992 | Behmann | 210/151 |

FOREIGN PATENT DOCUMENTS

| | | |
|---|---|---|
| 2430451 | 12/1980 | France . |
| 63-62599 | 3/1988 | Japan . |
| 3-12288 | 1/1991 | Japan . |

OTHER PUBLICATIONS

Phase I Final Report–Shipboard Sewage Treatment System by Bailey, James; Bambaris Ivars; Presti, John from General Dynamics Electric Boat Division, Nov. 1971.

Primary Examiner—Christopher Upton
Attorney, Agent, or Firm—Alfred D. Lobo

[57] ABSTRACT

Raw sewage ("black water" from toilets), wastewater from showers, sinks, kitchen facilities ("grey water") and oily water from the bilge of a host vessel ("oily water"), in combination, unexpectedly provide the essential nutrients for a live mass of mixed microorganisms which are peculiarly well-adapted to ingest the nutrients. To facilitate availability of oxygen to the microorganisms so as to provide growth of the microorganisms, and also, to allow them destroy to themselves, excess oxygen is discharged, in a combination of microbubbles and macrobubbles, into a membrane bioreactor ("MBR"). The mixture of bubbles is preferably generated with coarse (>2 mm) and fine (<20 $\mu$m) bubble diffusers. An auxiliary stream, whether alone, or a recirculating stream into which air is drawn, may provide the coarse bubbles. The air is entrained, in a jet aerator or eductor, in a recirculating loop of activated sludge taken from the MBR. Another portion of the contents of the MBR is pumped to a semipermeable membrane which provides water (permeate) of excellent quality. The remaining concentrate is led to a gas micronizing means which produces a tail-jet of microaerated concentrate. The tail-jet is returned to the MBR to provide kinetic energy for maintaining a high velocity of liquid flow in the MBR. A portion of the concentrate is disposed of. Preferably the liquid waste to be treated onboard does not substantially exceed about 21 meters$^3$/day.

20 Claims, 4 Drawing Sheets

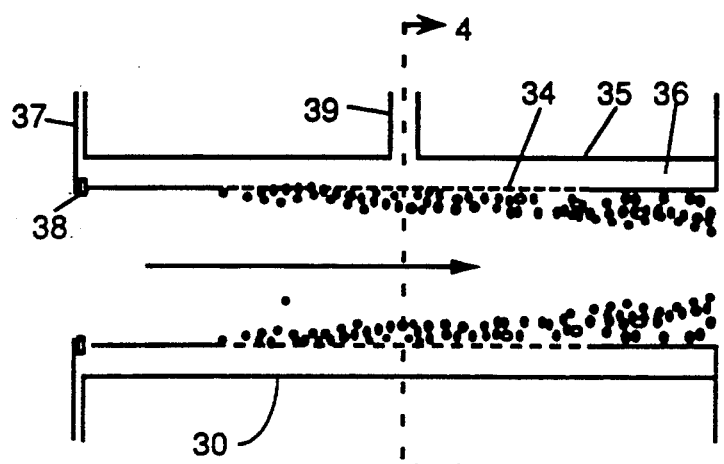
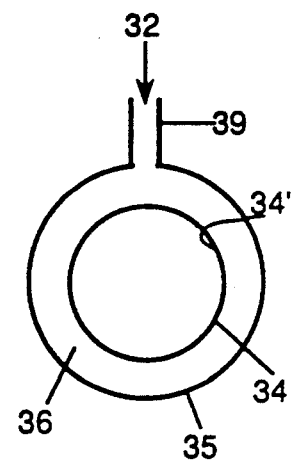
FIG. 3   FIG. 4
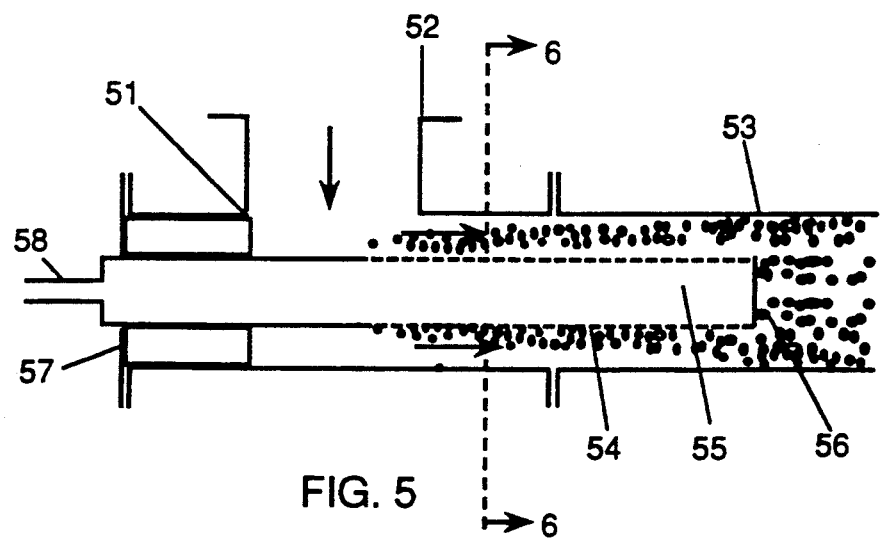
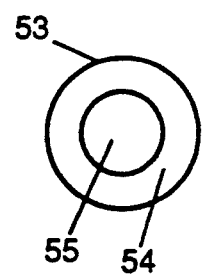
FIG. 5   FIG. 6

MODULAR SHIPBOARD MEMBRANE BIOREACTOR SYSTEM FOR COMBINED WASTEWATER STREAMS

This application is a continuation-in-part of Ser. No. 07/794,867 filed Nov. 19, 1991, now U.S. Pat. No. 5,151,187.

BACKGROUND OF THE INVENTION

Disposal of organic waste at sea, particularly bilge water containing oil from the engine room, is a serious problem governed by state, national and international environmental regulations. Even were a sea-going vessel able to dump its holding tanks at sea, it would have to leave port to do so. Since the day-to-day operation of a large ship such as an ocean liner, cruise ship, or battleship is closely tied to the successful management of its solid and liquid waste, the importance of the problem will be better appreciated when one considers that a large ship's waste generation at sea is much like that of a small city, except that the ship rolls, pitches and tosses, and there is not much space available to store the waste for disposal at a later date.

This invention is directed to the solution of a specific problem, namely the disposal, on-board ship, of liquid waste with a high solids content. The solids are both suspended (or, water-insoluble), and dissolved. The constant motion of a marine vessel, at times less violent than at others, precludes the successful use of an organic waste liquid disposal system in which separation of suspended solids and activated sludge is effected in a biological reactor ("bioreactor") in combination with a conventional gravity separation means for separating sludge. Even when an ultrafiltration (UF) system has been used to separate oil/water-emulsions with appropriate membranes, in combination with conventional oil removal techniques, the UF system was found ineffective to remove lower molecular weight hydrocarbons, say in the range from $C_6$–$C_{12}$, and highly soluble organics such as surfactants in the grey water. Organic compounds which cannot be separated by UF membranes must be removed by biological oxidation.

The problem of disposing of raw sewage onboard ship was addressed by the U.S. Navy in a report titled "Phase I Final Report—Shipboard Sewage Treatment System—Contract No. N00024-71-C-5329" published by National Technical Information Service in report No. AD733082. In this system, an aerated membrane biological reactor ("MBR") was used to treat (or "condition") the raw sewage stream. Activated sludge was continuously withdrawn from the reactor through a rotating, self-cleaning drum type screen that prevents cloth, paper, plastic, metal, or wood pieces from entering the membrane system. The conditioned and screened sludge is then circulated to the membrane loop at a rate approximately four times that of the incoming sewage. Some of the conditioned sewage passes through the membrane as purified effluent (permeate) and is discharged, while the remainder (concentrate) is recycled to the reactor. Though they treated the raw sewage successfully, they concluded that activated sludge systems are highly responsive to changes in environmental conditions within the MBR. This sensitivity of the MBR dissuaded one from dealing with a more complicated system, namely one in which other streams might be added to the raw sewage.

Though there is no suggestion in the Navy report to add any other stream to the shipboard raw sewage MBR, in the past, oily streams have been treated in a raw sewage MBR on land. A treated stream is withdrawn from the reactor at the same rate as the incoming feed, and filtered through a cross-flow UF membrane. Digestion of the oils required the addition of nutrients for the organisms, typically, phosphates and nitrogen-containing compounds.

There was no suggestion that any commonly generated waste stream might provide adequate nutrient value. Moreover, with respect to grey water, there was no reason to treat such a waste stream which regulations permitted to be dumped at sea without treatment. Further, depending upon whether solid or liquid nutrients were provided, the operation of the reactor was different. Since water-insoluble oil in a bilge water stream typically discharged from a ship's engine room twice a day, is peculiar to a large ship, and there was no suggestion in the art as to what might provide an adequate source of nutrients, it was particularly unexpected that adequate nutrition for effective microorganisms, including bacteria, may be provided by any combination of streams available on-board a ship.

The discovery that raw sewage ("black water") and waste water from showers, sinks, laundries and kitchen facilities ("grey water"), together, are able to provide the necessary nutrients for appropriately acclimated microorganisms which digest the bilge water, and the availability of both black and grey water on-board ship, sparked the attempt to adapt a MBR for use on-board a ship. It must be kept in mind that combining the bilge water with black and grey water results in a stream having a solids concentration (mass/unit volume of stream), which is from 3 to 10 times greater than that normally encountered in a municipal waste stream.

More specifically, because of the discovery referred to hereinabove, this invention is based on the essentially concurrent treatment and disposal of (i) "black water", (ii) "grey water", and (iii) "oily water" discharged from engine rooms and in ballast water.

A solution to the problems relating to minimizing the amount of activated sludge generated despite variations in the availability of each stream under different conditions of operation of the ship, and how these conditions affect the reliable operation of an on-board MBR, define the invention claimed herein.

Though MBRs are known for use on land-based waste disposal systems, their use on-board ship was deemed an unlikely application because an MBR process to digest insoluble solids, present in a "high-solids" waste stream containing up to 5% organic solids, requires a long solids retention time ("SRT") to provide adequate retention of emulsified oil and certain soluble components, so as to achieve the desired treatment of waste.

A practical shipboard MBR to treat an aqueous suspension of a liquid waste combination of black water, grey water and bilge water, is necessarily compact because it is limited by the availability of space below deck. Yet it must, under full load operating conditions, treat a "high-solids" liquid waste stream having at least 1% organic solids, more typically from 2%–5%; and, this stream of exceptionally high organic content is delivered in surges which, most of the time, load the MBR to its maximum capability.

The solution to the problem requires dealing with two inter-related conversion processes. First, the organic solids are to be converted biomass; and, then, the biomass is to be destroyed by the microorganisms, converting the biomass to carbon dioxide and water.

Since the two processes, simultaneously occurring in the bioreactor are at cross-purposes, operation of the process is carried out under conditions suitable for both processes. Such conditions demand a large excess of oxygen supplied to the live microorganisms under conditions which make the oxygen available to them in such a way as to regenerate themselves and at the same time, destroy themselves. To provide a relatively short hydraulic retention time ("HRT") less than 24 hr, and a very long solids retention time ("SRT") more than 5 days, preferably >10 days, the oxygen must be adequately dispersed in the bioreactor with sufficient macromixing of the activated sludge, so as to do both. The combination of an external gas micronizing means ("micronizer" for brevity) which generates microbubbles, and, an auxiliary stream to supply air, provides macromixing and the desired combination of short HRT and long SRT. Whether the auxiliary stream is air alone, or air entrained in liquid, it provides macrobubbles with sufficient kinetic energy to effect macromixing.

To cope with black water: At the present time, in the art of conforming to the environmental regulations for disposal of liquid waste at sea, black water is stored in holding tanks. A high chlorine level is maintained in the tanks to kill living organisms. To minimize the volume of black water stored, a vacuum system is used to flush toilets. In those instances where a small conventional biological reactor has been retrofitted on-board ship, the reactor was able to treat only the black water because it was too small to handle the volume of grey water. When generation of the raw sewage decreased greatly, as when most of the persons on board debarked, the organisms in the reactor failed to survive. Further, it was found to require too much of an operator's time when it was in operation.

To cope with grey water: to date, it is not treated since there are no regulations which proscribe dumping the untreated grey water at sea.

To cope with oily water: disposable porous substrate filter cartridges, in combination with other oily water separators, have been used because settling tanks are ineffective. Separated oil is then held in a storage tank and the oil-laden cartridges are stored in bins until they can be off-loaded on land.

Currently, there is no system available for use on a sea-going vessel, or even on an oil derrick operating offshore, which system can dispose of oily water, black water and grey water, with due concern for the environmental regulations now in force, or those which are scheduled to be enacted in the near future.

Conventional microfiltration ("MF") and/or ultrafiltration with membranes, not only avoids the time penalty of gravity settling technology, but also provides a highly effective purification means. What was not appreciated is that the permeate is typically less than 5% by volume of the feedstream flowed over the membranes so that the kinetic energy remaining in the concentrate is substantial. It is this remaining kinetic energy which is utilized in a membrane bioreactor system with an in-line gas micronizer such as is disclosed in the parent application.

The rate of transfer of oxygen limits the biomass concentration in an activated sludge wastewater treatment system (see *Aerobic biological Treatment of Wastewaters: Principles and Practice* by A. W. Bush Pg. 285-312 Oligodynamics Press 1971). There are numerous references teaching how to aerate a bioreactor (hereafter "reactor"); and, membrane devices have long been known to be highly efficient separating means to filter solids-free permeate from the solids-containing concentrate. But aerating a reactor efficiently is not simply a matter of blowing copious amounts of air through the suspension of solids in the reactor. As stated above, the oxygen supplied must be available to the biomass. How effectively oxygen is made available is a measure of the economic success of the reactor.

Mindful of the foregoing considerations, the fact is that the cost of aerating a reactor effectively and efficiently requires a large expenditure of energy; and filtration through a membrane device requires a relatively high inlet pressure and high velocity of flow of concentrate through the membrane device; this requirement of high mass flow under elevated pressure in turn dictates high pump pressures, and high flow rates at elevated pressures which results in large pressure drops.

In particular, the high energy requirements for pumping a suspension of organic solids from a bioreactor through a membrane filtration unit, and using the energy of the concentrate stream from the unit to entrain oxygen from an eductor requires that the kinetic energy of the concentrate stream be used to draw in and disperse the required oxygen-containing gas stream. Such a configuration has been suggested in French application 2,430,451 to Lambert et al filed Jul. 4, 1978. The efficiency of the system is adversely affected because dissipation of the kinetic energy of the recirculating stream provides no positive energy contribution to the recirculating stream.

The high mass flow and kinetic energy of the recirculating stream in the '451 reference contributes so much energy to the system that efficient mixing in the reactor results simply because of the high contribution of fluid energy, minimal residence time, and without concern as to the establishment of a recirculating pattern. Further, since a characteristic of an eductor is that gas entrainment is limited by the mass flow of the recirculating stream and the resulting pressure drop generated in the eductor, under optimum conditions, one can typically only entrain less than about 1 volume of oxygen per 5 volumes of recirculating liquid, or, 1 volume of air per volume of recirculating liquid.

This physical limitation will be more readily understood by reference to an illustrative example wherein a 30 liter reactor is provided with a recirculation stream of 6500 liter/hr (6.5 m$^3$/hr) so that the residence time is 16 sec. Of this stream, 3500 liter/hr goes to a single eductor which entrains 3500 liter/hr of air. The inlet pressure of the recirculating stream into the eductor is 200 kPa gauge (30 psig). Though the membrane bioreactor system operates at low to medium pressure, in the range from about 100 kPa to 500 kPa, depending upon whether the membrane filtration device uses a microfiltration or ultrafiltraton membrane, a high mass flow of solids-containing concentrate is available for a recycle stream. This mass flow is sufficiently high (i) to provide enough liquid as is required per unit of air entrained, (ii) to provide sufficient mixing to ensure homogenization of the biomass, and (iii) to establish a preselected recirculation pattern in the bioreactor.

The relatively high cost of operation of the combination of a bioreactor and a membrane filtration device can be off-set with a "micronizer" (a particular form of an in-line microbubble generator) positioned so as to provide a directed recirculating jet (referred to as a "tail-jet") within the bioreactor.

In particular, operation of a membrane filtration device with a shipboard bioreactor requires accepting the likelihood of serious membrane flux decline, that is the rate per unit area of membrane surface through which permeate leaves. Such decline is typically due to insufficient oxygen being introduced to meet the respiration rate of the biomass, resulting in clogging of the membrane's pores. This problem of clogging suggested that the use of a microporous gas diffuser means (such as a porous metal annular element) was contraindicated because of the proclivity of a microporous element to be clogged by biomass.

The challenge to provide the proper amount of air to an aerobic reactor has been addressed in numerous references such as *Wastewater Engineering* pp 492–502, Metcalf & Eddy Inc. McGraw Hill 1979; *Activated Sludge Process: Theory and Practice* by J. Ganczarczyk, pp 133–153, Marcel Dekker 1983; *Wastewater Treatment Plant Design* pp 241–258, Water Pollution Control Federation, 1977; and a host of patent references.

Favored among devices for introducing air into an aerobic reactor are jet aerators, because of the high oxygen transfer they efficiently provide, but have restricted flexibility because of their design. Jet aerators are also referred to as ejectors, injectors, venturi nozzles, and eductors. Such devices introduce oxygen and water in a two-phase stream at a velocity high enough to provide requisite mixing within the reactor. The two-phase stream leaves the jet aerator in the form of a free jet (referred to herein as a "tail-jet"), which having penetrated a certain distance into the surrounding liquid, loses its energy and breaks up into clouds of bubbles. (See *Sorption Characteristics of Slot Injectors and Their Dependency on the Coalescence Behaviour of the System,* by M. Zlokarnik Chemical Engineering Science Vol 34, pp 1265–1271, 1979; and, *Design Manual - Fine Pore Aeration Systems* U.S. Environmental Protection Agency, Office of Research and Development, Center of Environmental Research Information, Risk Reduction Engineering Laboratory, Cincinnati, Ohio 45268, September 1989).

Though much of the requisite oxygen transfer takes place in a jet aerator before the tail-jet is ejected into the reaction mass, the oxygen in the two-phase stream must also be transferred to the biomass in the reactor, and this requires a substantial residence time. An eductor, as used in the French '451 application, by itself, does not provide adequate oxygen transfer for a shipboard bioreactor.

Efficient operation of a shipboard bioreactor at full load required introduction of auxiliary air, in addition to that provided by the micronizer. Such an auxiliary air stream provides economical macromixing (the motive force for adequate recirculation of the biomass). When auxiliary oxygen is introduced as compressed air, the compressor provides the energy for macromixing. Auxiliary oxygen is introduced in an auxiliary stream with recycle, using a jet aerator or eductor to introduce air, and only as much energy as is required to provide a recirculation rate of liquid which provides the necessary oxygen requirement. Pumping liquid is an economical way to provide efficient movement of the liquid.

Prior art devices relied upon the recirculation stream to provide the kinetic energy for entrainment of oxygen and mixing of the reaction mass. There was, and is, very little motivation to provide recirculation energy in a recycle loop by using the energy of air (oxygen and/or ozone) under pressure, which air is required to feed oxygen to the biomass.

Yet, in the preferred embodiment, such energy is derived from the air used, the energy being transferred through a combination of (i) the micronizer which is a "fine bubble aerator", and (ii) an auxiliary aerator.

The micronizer is an in-line porous element having through-pores which place its interior and exterior surfaces in open fluid communication, and the device is configured to provide a tail-jet. If the tail-jet has enough energy it can establish a recirculation pattern within the reactor. The micronizer is preferably located outside the reactor, and operated in the recycle loop in combination with the reactor and MF or UF membrane means in this novel shipboard MBR system, as will be described in greater detail below.

The auxiliary aerator is most preferably an "air-only" coarse bubble aerator, which is simply a porous cylindrical element with a closed end and an open end. The closed end and cylindrical wall of the element have large pores in the range from 1 mm to 5 mm in diameter. Compressed air is blown through the open end of the aerator and the energy of the air provides the motive force to establish a desirable recirculation pattern in the reactor.

When used in combination in a shipboard MBR, the micronizer and the auxiliary stream allow the effective use of either a MF and/or a UF membrane means to provide a permeate of acceptable quality. There has been no suggestion that any prior art system using a bioreactor to digest oily water, whether on land or at sea, might be effective with only a membrane filtration means, to make the separation of the activated sludge reaction mass from the permeate.

SUMMARY OF THE INVENTION

It has been discovered that black water, grey water and oily water, in combination, unexpectedly provide the essential nutrients for a live mass of mixed microorganisms which are peculiarly well-adapted to ingest the nutrients, thus, increasing their biomass while disposing of the organic matter in the nutrient stream, and concurrently gasifying biomass. To facilitate availability of oxygen to the microorganisms so as to discharge both functions concurrently, excess oxygen is discharged in a combination of microbubbles and macrobubbles in a membrane bioreactor ("MBR"). The mixture of bubbles is generated with coarse (>2 mm) and fine (<20 $\mu$m) bubble diffusers. Preferably two recycle loops are used, each in flow communication with the reaction mass. The first recycle loop circulates a portion of the reaction mass to a membrane separation means including an MF and/or a UF membrane, and the concentrate to the reactor. A portion of the permeate may be recycled, or all of it at start-up and under shock loading conditions when low quality of permeate prevents discharge. The second recycle loop circulates another portion of the reaction mass with an auxiliary stream, e.g. a jet aerator, to entrain air and be returned to the reactor to provide the motive force to establish a flow pattern within the reactor.

It is therefore a general object of this invention to provide a shipboard MBR system operating at atmospheric pressure and ambient temperature in the range from 0° C. to 30° C., which system utilizes a combination of black water, grey water and oily water as the only nutrients to feed a mass of mixed microorganisms which not only grow, but also destroy themselves generating carbon dioxide and water, thus reducing the amount of sludge to be disposed of.

It has also been discovered that a shipboard MBR may be fed with a regulated combination of a liquid waste comprising an oily water stream in combination with black water and grey water streams generated on a marine host vessel, whether a sea-going vessel or off-shore derrick, provided the system is configured as a substantially modular system including a semipermeable membrane filtration means, which system is integrated into the particular wastewater discharge patterns of the host vessel, and the discharge does not substantially exceed about 21 meters$^3$ per day.

It is therefore also a general object of this invention to provide a substantially modular MBR system comprising a MBR and a semipermeable membrane means, which MBR system can either be built into a new vessel, or retrofitted to a host vessel in either of which space is at a premium, and which MBR system will treat the liquid waste to comply with existing regulations, even when the system is subjected to the irregular motion of a ship at sea. In the MBR, biomass is continuously grown and concurrently, aging biomass is gasified, provided the MBR operates with a HRT <24 hr but a SRT >5 days.

It is a specific object of this invention to provide a MBR system adapted for use on a marine host vessel, referred to herein as a "shipboard MBR system", in which a variable flow of the components of the liquid waste is generated aboard the host vessel.

It is another specific object of this invention to provide a shipboard MBR system which requires essentially no human operator to attend it, is substantially insensitive to motion of the host vessel, and minimizes the onboard requirements for holding tanks and disinfecting chemicals; the size (design capacity, namely about 21 m$^3$/day) of the MBR system and its HRT are mainly determined by the flow rate of grey water, this being the major component of the liquid waste. Typically the daily volume ratio of (oily water):(black water):(grey water) is in the range from 1:1:4 to 1:1:8.

It is still another specific object of this invention to provide a shipboard MBR system which functions as a fluid-balancer, balancing the uneven flow rates, and random variations therein, particularly of the black water and oily water; and, the sole operation of which MBR system dispenses with the use of: (a) prior art activated sludge processes which use less than 10 g/L of live organisms in the reactor; (b) clarifiers for solid separation; and (c) any other combined physical-chemical treatment processes.

It has further been discovered that in a shipboard MBR system, an in-line micronizer in the recycle loop allows economical recirculation of concentrate from the membrane device to the bioreactor, and results in operation of the system with unexpectedly good time-energy sensitivity, despite the relatively high costs of operation of a compressor which supplies an oxygen-containing gas stream to provide a substantial portion of the motive force required to establish a desired recirculation pattern of the solids suspension in the reactor. The recirculation pattern is established with a tail-jet which directs the recirculating stream into a preselected zone within the reactor. The remainder of such motive force is provided by a pump means which continuously recirculates a portion of the reaction mass in the bioreactor.

It is therefore a general object of this invention to provide a process for treating difficultly biochemically oxidizable oily water with live microorganisms which would be unable to treat the water, but for the concurrent flow of black water and grey water. Excellent digestion of all three streams is obtained using a MBR system in which a micronizer means is positioned external to the bioreaction zone so as to provide a tail-jet to establish a recirculation pattern within the reactor. The micronizer is pressurized with a gas containing at least 20% oxygen, and requires a relatively high-velocity stream of coaxial, internally flowing, recirculated concentrate from the membrane filtration device, to shear incoming gas so as to entrain bubbles of the gas having a diameter, under pressure, in the range from 1 $\mu$m to about 1000 $\mu$m (microns), in a stream of microaerated concentrate. The microaerated concentrate, now containing the energy of the flowing liquid together with that of the compressed gas, is ejected beneath the surface of the reaction mass to provide requisite oxygen transfer and recirculation velocity to the reaction mass. The energy of the recycle stream without the air or other oxygen-containing, preferably oxygen-enriched gas, is insufficient to provide the requisite motive force for adequate oxygen transfer, and to establish a predetermined recirculation pattern.

It is a specific object of this invention to provide a process for treating organic liquid waste utilizing a membrane-bioreactor system, the process comprising, (a) feeding an aqueous suspension of said liquid waste comprising black water, grey water, and oily water to a bioreaction zone containing live microorganisms adapted to digest said liquid waste;

(b) flowing activated sludge withdrawn from said bioreaction zone, to a membrane filtration zone at a velocity and pressure sufficient to maintain a predetermined membrane flux therein, at which flux essentially no solids are retained on the surface of said membrane;

(c) separating water which is essentially solids-free, as a permeate, from a solids-containing concentrate, and removing the permeate from said membrane filtration zone;

(d) flowing said concentrate from said membrane filtration zone into a gas micronizing zone comprising a microporous air diffuser element without introducing any additional energy into said concentrate until it is introduced into said micronizing zone;

(e) introducing said concentrate axially into said micronizing zone, while discharging into said zone a gas containing at least about 20% oxygen under pressure in the range from about 150 Kpa to about 1000 kPa so as to incorporate micronized gas bubbles having an average diameter in the range from 1 $\mu$m to about 1000 $\mu$m into said concentrate, forming a microaerated concentrate having separate gas and liquid phases;

(f) directly flowing a continuous stream of the microaerated concentrate from the micronizing zone into the bioreaction zone without introducing additional energy into the microaerated concentrate after it leaves the micronizing zone;

(g) introducing a first tail-jet of said microaerated concentrate below the surface of liquid in the reactor to establish a recycle loop in said bioreaction zone;

(h) flowing an auxiliary stream of air in the form of relatively coarse bubbles with enough energy to maintain a desirable recirculation pattern in said reaction zone; and, at the same time, directing said first tail-jet into said bioreaction zone so as to maintain an average liquid velocity of at least 0.3 meter/sec within the bioreaction zone while also maintaining said recirculation pattern therein.

It is also a specific object of this invention to provide the above process in which a feed of aqueous mixed liquid biodegradable waste is continuously introduced into the bioreactor; and to withdraw, either periodically or continuously, a bleed stream of concentrate from the recycle loop prior to introducing said concentrate into the micronizer, so as to modulate the solids concentration in the bioreaction zone.

It is a further specific object of this invention to provide the above process in which the concentrate is introduced axially into the micronizer at a velocity of at least about 3 meters/sec; the microaerated concentrate provides an oxygen transfer into the reaction mass of up to 500 mg/liter/hr; and, the recycle loop provides a power efficiency for the membrane-bioreactor system, of at least 0.9 kg $O_2$/Kwh.

It is still another specific object of this invention to position an in-line micronizer externally relative to the bioreactor and to introduce the tail-jet under the surface of liquid, preferably vertically and substantially centrally, within reactors in the range from about 100 L (liters) to 5000 L, preferably 1500 L and 3000 L, to complement the geometry thereof, so as to establish a desirable recirculation pattern.

It is another specific object of this invention to provide a shipboard MBR system which relies on only two moving parts, namely a compressor (or high pressure blower) and a pump. The system provides surprisingly (a) high oxygen transfer rates, able to support the maximum biomass concentration, and (b) high oxygen transfer efficiency over a wide range of flow of liquid waste without sacrificing oxygen economy even when enriched oxygen is used. When a cylinder of gas provides the source of pressurized gas, the system relies on only one moving part, namely the pump.

It is therefore also a general object of this invention to provide a shipboard MBR system to be connected between an inlet for the aforesaid liquid waste, and, an outlet for treated effluent, comprising, (a) a bioreactor constructed and arranged to operate essentially continuously while maintaining a predetermined level of activated sludge within a reaction zone, with means for receiving the liquid waste to be contacted with waste-degrading microorganisms agglomerated as solids mixed in the waste;

(b) pump means for withdrawing a suspension of the solids from the bioreactor, and impelling the suspension at elevated pressure through a discharge line;

(c) membrane filtration means in fluid communication with the pump means, the membrane filtration means including plural membrane element means for separating the solids in a concentrate stream from water permeate which is essentially free of solids, and means to duct the permeate away from the system;

(d) a gas micronizing means, exteriorly disposed relative to the bioreactor and in direct open-flow communication with the concentrate stream from the filtration means, in fluid communication with the filtration means; the gas micronizing means comprising, (i) a tubular microporous body coaxially housed in a housing means for containing gas under elevated pressure, and contacting the gas with the concentrate stream; (ii) inlet means for the gas; and, (iii) inlet and outlet means for the concentrate stream to be flowed through the gas micronizing means; control means on inlet means to modulate the flow of oxygen to the gas micronizing means, in an amount required to maintain a specific residual dissolved oxygen ("DO") concentration;

(e) conduit means directly placing the outlet means from the micronizing means in open fluid communication with wastewater in the bioreactor, the conduit means having a tail-jet outlet means for discharging a tail-jet of mixed gas and liquid phases below the surface of the wastewater at a velocity sufficient to generate a chosen pattern of recirculation in the bioreactor while maintaining a liquid velocity of at least 0.3 meter/sec within the bioreactor; and, (f) conduit means to supply an auxiliary stream including coarse bubbles of air in the size range greater than 2 mm, generally from 2-20 mm, with enough energy to maintain a desirable recirculation pattern in the reaction zone.

It is a specific object of this invention to operate a shipboard MBR system in which the combination of a pump means and a source of pressurized oxygen-containing gas, such as a blower or compressor means, or other source of pressurized gas in a recycle loop, provides all the energy for microaerating the reaction mass with micron-sized bubbles generated through pores less than 20 $\mu$m in diameter, preferably from 0.1 $\mu$m to about 1 $\mu$m in diameter, of oxygen-containing gas, at the same time, maintaining necessary recirculation within a liquid bioreaction mass preferably no wider than it is deep; obtaining an oxygen transfer rate in excess of 30 g/L/day at >15% (greater than 15%) transfer efficiency using unenriched air; and, accomplishing the foregoing by manipulating a single valve means using feedback control means actuated by the dissolved oxygen ("DO") concentration in the bioreactor.

Specific advantages of the MBR system are as follows: (a) the compact system and squat reactor use minimal space and power; (b) the energy with which oxygen is introduced by combining the micronizer and the auxiliary aerator results in high oxygen transfer efficiency and minimizes the power required to operate the system; (c) oily water including bilge water may be digested; (d) permeate quality is good with a MF membrane and excellent with a UF membrane; (d) digestion of complex high molecular weight dissolved organics is improved by controlling the HRT and SRT, hence the age of activated sludge discharged; and, (e) since no solids are to be settled the solids concentration of the activated sludge may be 5 to 10 times greater than that in a conventional suspended growth bioreactor.

BRIEF DESCRIPTION OF THE DRAWINGS

The foregoing and additional objects and advantages of the invention will best be understood by reference to the following detailed description, accompanied with schematic illustrations of preferred embodiments of the invention, in which illustrations like reference numerals refer to like elements, and in which:

FIG. 3 is a side elevational cross-sectional view diagrammatically illustrating one embodiment of a gas micronizer.

FIG. 4 is a cross-sectional view taken along the line 4—4 in FIG. 3.

FIG. 5 is a side elevational cross-sectional view diagrammatically illustrating another embodiment of a gas micronizer.

FIG. 6 is a cross-sectional view taken along the line 6—6 in FIG. 5.

DETAILED DESCRIPTION OF PREFERRED EMBODIMENTS

The key to the effectiveness of the novel shipboard MBR system was the discovery that the organic content of a combination of three wastewater streams generated on-board ship could provide the appropriate nutrition for an exceptionally high concentration of live organisms, greater than 10 g/L, and preferably from 10–30 g/L in the reactor. Such a high concentration was not deemed sustainable in the art.

The content of a typical shipboard mixed liquid waste nutrient stream is set forth below:

| | |
|---|---|
| Biochemical Oxygen Demand (BOD) | 400–2000 mg/L |
| Suspended Solids (SS) | 400–1500 mg/L |
| Volatile Suspended Solids (VSS) | 300–800 mg/L |
| Total Organic Carbon (TOC) | 200–500 mg/L |
| Ammonia Nitrogen (AmmN) | 50–150 mg/L |

The oily water flow is typically in the range from 2–3 m$^3$/day and consists essentially of a mixture of lubricants, both petroleum derived and synthetic, spilled fuel and miscellaneous chemicals mixed with freshwater and seawater. Typical components are engine oil, engine coolant including diethylene glycol, hydraulic fluid and diesel fuel.

The grey water flow is typically in the range from 8–15 m$^3$/day consisting essentially of detergent laden water from showers, sinks, laundry and kitchen.

The black water flow is typically in the range from 2.5–3 m$^3$/day consisting essentially of the discharge from toilets.

Figure 1:
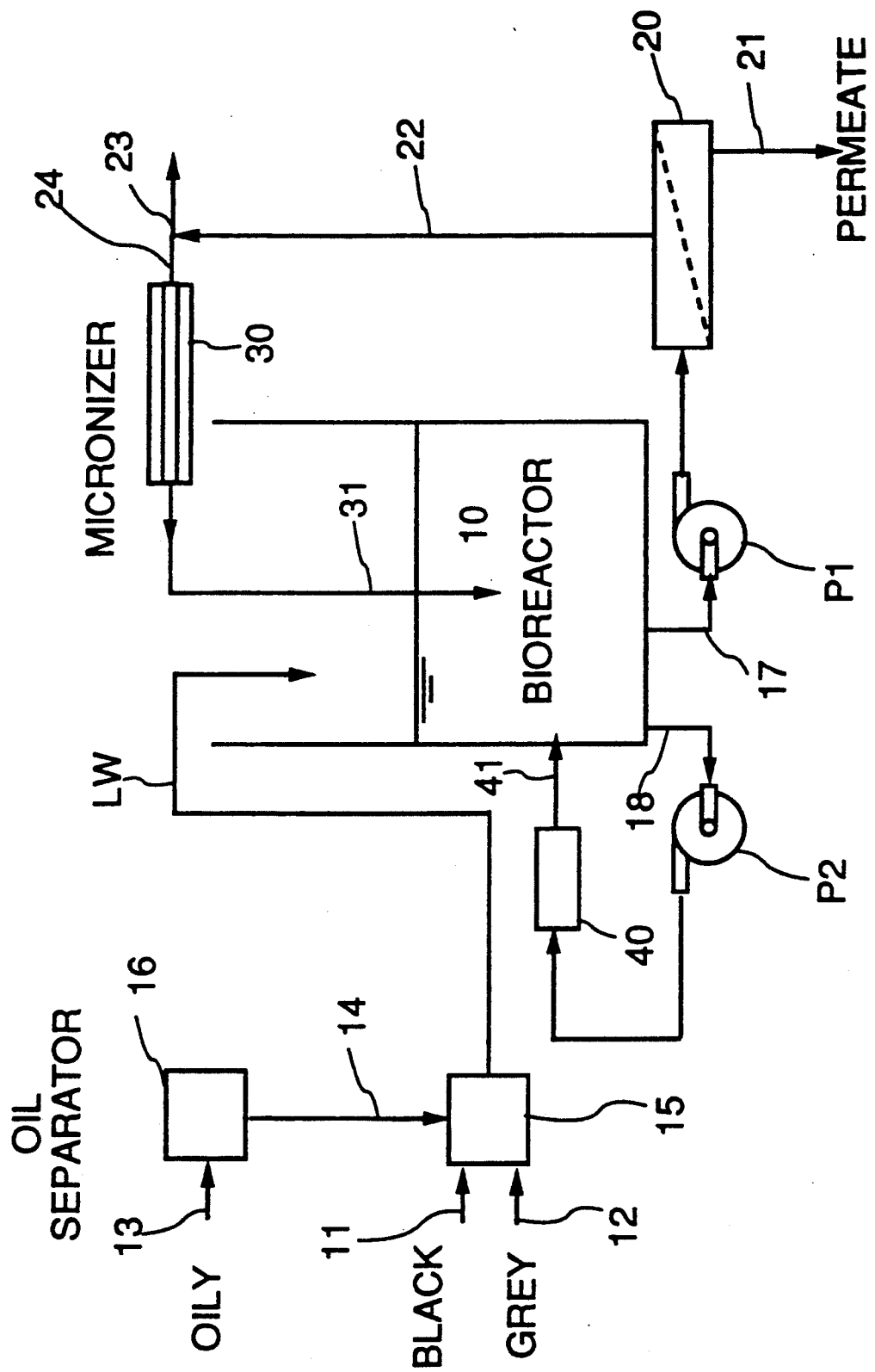
FIG. 1 is a simplified flow diagram for a process using a shipboard MBR system, diagrammatically illustrating the combination of black, grey and oily water streams treated in a bioreactor and filtered by a UF or MF membrane means (a UF filtration means is shown).

Referring to FIG. 1, the shipboard MBR system comprises a closed, but vented, bioreactor 10 containing a suspended growth activated sludge in which live microorganisms grow by digesting liquid waste LW continuously flowed into the reactor 10. The liquid waste LW comprises a black water stream 11, a grey water stream 12 and an aqueous dispersion of oils 14. The streams 11 and 12 are preferably mixed and flowed to a comminutor 15 which reduces solids to particles having a maximum average size of about 2 mm. The aqueous dispersion 14 is the component of an oily water stream 13 which is flowed to an oil separator 16 which removes floating oil.

A portion 17 of the activated sludge in the bioreactor 10, is withdrawn at a rate such that the sum of the flow rates of permeate 21 and concentrated activated sludge discharged from the system equals the flow rate of liquid waste LW. The portion 17 is pumped by pump P1 to a MF or UF membrane means 20 (UF is shown) which filters the treated waste, producing a clean filtrate ("permeate") 21 and a recycle of "concentrate" 22 which is concentrated activated sludge. A portion 23 of the recycle is withdrawn from the system as sludge, the remaining portion 24 being flowed to a micronizer 30 where it is aerated to form a two-phase stream 31 of concentrate and micron-sized bubbles which is introduced as a tail-jet into the reactor 10.

The threshold size above which organics are retained by the MF or UF membrane, and below which the organics pass through the membrane, is termed the "molecular cut-off" for the membrane. The molecular cut-off for UF membranes used in the shipboard MBR unit is in the range from about 3,000 to about 100,000 Daltons (0.003 $\mu$m–0.1 $\mu$m) and is a function of the membrane materials. The typical operating pressure of a UF membrane module is in the range from 400–500 kPa (60–70 psi). The molecular cut-off for MF membranes is in the range from about 100,000 to about 500,000 Daltons (0.1 $\mu$m–1 $\mu$m). The typical operating pressure of a MF membrane module is in the range from 400–500 kPa (20–60 psi).

It is critical to the successful operation of a shipboard MBR system that the reactor provides adequate HRT, based on liquid waste flow rate, and SRT. Soluble organics greater than the molecular weight cut-off are retained in the bioreactor for a period 10 to 15 times longer than the HRT based on liquid waste flow rate. As a result the microorganisms have a longer time to mineralize the organics and better degradation is obtained.

Appropriately operated, the permeate 21 has a BOD (biological oxygen demand) <10 mg/L; suspended solids (water-insoluble) <10 mg/L; and oil and grease <15 mg/L.

Another portion 18 of the reaction mass is withdrawn from the reactor 10, and pumped by pump P2 to an eductor 40 where the reaction mass is entrained with air to form a second two-phase stream 41 of reaction mass and coarse bubbles having a size range >2 mm. The stream 41 is introduced near the bottom of the reactor 10 to agitate its contents.

Figure 2:
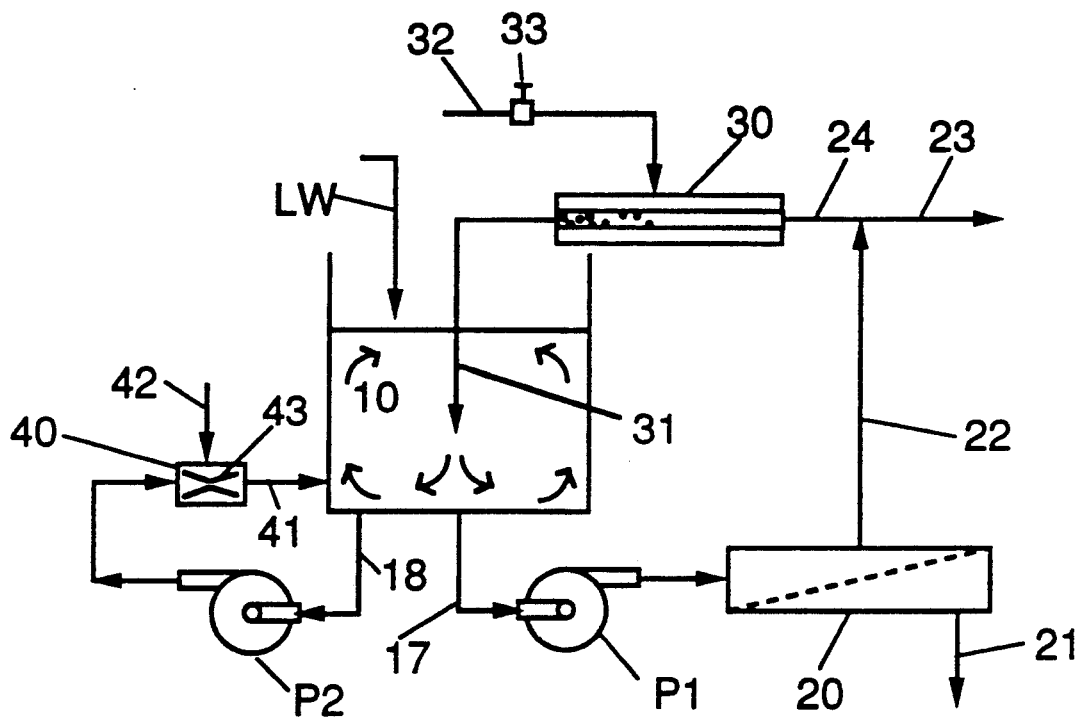
FIG. 2 is a schematic illustration of a modular shipboard MBR system, showing details of a first embodiment comprising two recycle loops, a first loop containing a micronizer ("fine bubble aerator") which provides an aerated tail-jet; a second loop containing an auxiliary aerator in the form of a jet aerator (an eductor is shown); the energy provided by the air in the loops maintains continuous recirculation of solids with a combination of and a coarse bubble stream.

Referring to FIG. 2 there is schematically illustrated details of the first and second recycle loops containing the micronizer 30 and the eductor 40 respectively. The stream LW enters the bioreactor 10 and in the first recycle loop ("micronizer loop") is subjected to oxidation with air 32 metered through valve 33 and introduced through the micronizer 30 in an amount sufficient to provide adequate agitation within the reaction mass. In the second recycle loop ("jet-aerator loop"), the portion 18 entrains air 42 in the eductor 40. Either the micronizer 30 or the eductor 40, alone may supply the oxygen required to grow the mixture of acclimated live cells in the reactor.

The eductor serves mainly to agitate the reaction mass, but also provides bubbles intermediate in size between those provided by a fine bubble aerator and a coarse bubble aerator. Bubbles provided by a jet aerator range in size from about 20 µm to about 20 mm, more typically from 50 µm to 10 mm, most of which are greater than 2 mm in diameter. The micronizer provides a copious supply of oxygen during periods of high oxygen uptake. It is preferred to use both, the eductor and the micronizer during periods of high oxygen uptake.

The micronizer 30 is located externally of the bioreactor, in the recycle conduit 24 through which concentrate is recycled to the bioreactor, and the eductor. Effective aerobic bioconversion of organics increases the mass of cells ("biomass") in the reactor and converts the organics into carbon dioxide and water.

The eductor 40 is also located outside the reactor. The eductor is preferably supplied with compressed air 42, though ambient air may be used. The air is introduced at the throat of a venturi 43, and the discharge from the eductor is guided along the inner periphery of the reactor, near the bottom, to establish a desired flow pattern.

It is now evident that the UF membrane means, the gas micronizer and the eductor are exteriorly connected in fluid communication with the common reaction mass, in two recirculation (or "recycle") loops; all the energy required to operate the system is provided by the recirculation pumps and a gas compressor means which pressurizes the micronizer, and, optionally supplies air to the eductor. As illustrated, the tail-jet 31 is introduced axially vertically in the bioreactor and discharges the tail-jet downward against the bottom of the bioreactor, forming a looping pattern (in an elevational view) in each vertical half-section of the vessel.

The bioreactor 10 has a volume of about 100 L, is cylindrical, and provided with a vent (not shown). The reaction mass preferably occupies a volume which is at least as wide as it is deep, so as to fit between decks. The volume of the activated sludge is maintained at from 50–60% of the volume of the bioreactor, the void space in the reactor being used for equalization of hydraulic flow variations to the bioreactor, and for organic buffering.

Effluent from the bioreactor 10 is pumped by pump P1 through conduit 17 to the UF unit 20 in which one or more UF membrane elements are housed so as to separate the effluent into a permeate stream flowed through conduit 21, and a concentrate stream 22 which is recycled to the bioreactor 10 through the micronizer 30. The pump P1 is a high pressure pump capable of delivering a sufficiently high pressure for the effective separation of the effluent in the UF unit, and to provide a concentrate recycle stream having a high enough velocity to take up oxygen in the micronizer and thereafter flow through conduit 31 with sufficient energy to produce good mixing of the contents of the biomass in the bioreactor.

The micronizer 30 is provided with a feedback controller (not shown) to manipulate a valve on the air supply conduit to the micronizer so as to proportion the amount of air required to maintain the DO residual. To provide such mixing the bubble-containing concentrate is discharged from the end of the conduit 31 centrally within the reactor and about from 0.5 to 1 meter above the bottom of the tank, being ejected downwards so as to promote a toroidal mixing pattern. As an alternative, the concentrate stream is ejected tangentially near the bottom periphery of the reactor to provide a vortex for mixing.

A portion of the permeate stream 21 may be recycled to the bioreactor and the remaining portion disposed of. The amount of permeate recycle to the bioreactor is typically controlled by the liquid level in the bioreactor but may also be dictated by the effluent quality which is sensed by a sensor in the line 44, so that permeate which does not meet the specified quality is recycled to the bioreactor for further treatment.

The biomass for the bioreactor is commercially obtained and nurtured over a period of time with the specified wastewater feed for a particular installation, until acclimated. Over time, some of the biomass is saved as cultures in a granular or dried material, or in an auxiliary reactor. Saved biomass can be added to augment the existing biomass as the occasion demands during periods of shock loading or after a prolonged period of inactivity due to lack of organic loading. The combined wastewater stream typically provides sufficient nitrogen, phosphorus and micronutrients in the black and grey water to make up for the lack of such nutrients in the oily water. However, when necessary, the feed to the bioreactor may be augmented with enzymes or detergents needed for hydrolysis of the more insoluble and bioresistant oils and greases.

A pH controller (not shown) monitors the pH of the contents of the reactor to maintain it in the range from about 6.5 to about 7.5 and the temperature of the biomass is regulated by a mechanically controlled temperature control valve on a heat exchanger within the reactor (not shown) through which cooling water is circulated. The heat exchanger removes heat of reaction as well as the heat input attributable to the high pressure pump P2.

The UF membrane elements are preferably tubes appropriately mounted in a housing analogous to the construction of a shell-and-tube heat exchanger. Though UF membranes are typically used, they may be supplemented with microfiltration membranes. For highest quality permeate, reverse osmosis (RO) membranes may be used in the membrane separation means after the MF or UF filtration.

The efficiency of the preferred system is predicated upon control of all factors which influence the overall time-energy sensitivity (hence, power requirement) of the system. In particular, the rate of oxygen transfer (mg/L/hr) to the reaction mass, and therefore, the power efficiency (kg $O_2$/kWh) are controlled. More particularly, the efficiency of the claimed invention is predicated upon the use of a pressurized gas micronizer which is an energy-supplying in-line diffuser rather than an energy-abstracting jet aeration device. The comparison of different devices which introduce air to aerate the biomass in different ways, demonstrates that there is a surprising difference in the effectiveness of the devices stemming from the different way in which air is introduced and utilized, in turn affecting the energy-efficiency of each processes in which each device is used.

In more detail, the gas micronizer means indicated generally by reference numeral 30 in FIG. 3 comprises at least one tubular microporous inner body referred to as an annular diffuser element 34, coaxially housed in an outer body or housing 35 in sealed relationship with the diffuser element, near the ends thereof, so that the annular space 36 between the outer surface of the diffuser element 34 and the inner surface of the housing 35, is adapted to contain gas under elevated pressure. Any sealing means may be used to effect the desired seal, a conventional way being to provide terminal matching tubular sections which are clamped to the ends of the housing 35 with clamping means 37 which have an internal O-ring 38 which provides a gas-tight seal for the annular space 36.

As illustrated in FIG. 4, the housing 35 is provided with a gas inlet 39 to which oxygen-containing gas 32 under pressure in the range from about 150 kPa to about 1000 kPa is supplied. The annular diffuser 34 is typically a porous cylinder, having through-pores in the range from 1 $\mu$m to about 100 $\mu$m (microns or micrometers), preferably less than 10 $\mu$m, through which gas under pressure emerges in a multiplicity of streams each comparable in diameter to the diameter of a pore in the metal cylinder.

Solids-containing water (concentrate) under pressure flowed through the bore 34' of the diffuser element 34 at a velocity sufficient to shear the thin gas stream into a very large number of micron-sized gas bubbles which become entrained in the water. Depending upon the relative pressures of the concentrate and gas streams, and the pressure drop through the diffuser 34, the size of the gas bubbles range from about 1 to about 1000 $\mu$m, but are preferably less than 10 $\mu$m as they leave the surface of the microporous element. Upon becoming entrained, the bubbles contribute their kinetic energy to that of the concentrate stream.

In another embodiment illustrated in FIG. 5, a tee 51 is inserted between orthogonally oriented ends 52 and 53 of recycle conduit 24 in the first recycle loop. A porous cylindrical diffuser element 54, shown in end view in FIG. 6, having an axial bore 55 and capped with a cap 56 is sealingly fitted into the tee 51, as for example with a bushing 57. The bushing positions the element 54 centrally coaxially within the aligned arms of the tee 51. A source of compressed air is flowed through a connecting fitting 58 into the bore 55 and is diffused radially through the pores of the element 54 into the recirculating liquid stream flowing over the element.

The surprising contribution of the gas micronizer to the time-energy sensitivity of the membrane-bioreactor system was discovered by making a comparison of the gas micronizer (commercially available as a Mott Gas-saver ®), a jet aeration device (commercially available as a Pardee Eductor ®), and a coarse bubble diffuser (commercially available as a PCI Hydro-Chek ® Air Diffuser), as described in greater detail in the parent application Ser. No. 794,867 the disclosure of which is incorporated by reference thereto as if fully set forth herein.

Liquid waste stream LW enters the bioreactor 10 and is mixed with an appropriate amount of a culture of microorganisms until the bioreactor has received a predetermined volume to be used as its reaction mass. Each recycle stream is continuous. To protect the reactor against operation with too low a liquid level, a float-operated switch (not shown) is provided. The switch sends a signal to actuate a valve which controls the destination of the permeate stream. If the level is high, flow is diverted to the drain; if the level is low, flow is returned to the bioreactor.

The pump P1 discharges a pressurized recycle stream through line 17 to the UF membrane filtration unit 20.

It is preferred to use a membrane filtration unit 20 in which the membrane has a pore size smaller than 1 $\mu$m, and more preferably smaller than 0.2 $\mu$m, typically in the range from about 0.001 $\mu$m–0.5 $\mu$m, with a clean water flux (measured at 20° C. and 370 kPa) of at least 10 m$^3$/m$^2$/day. The larger the pore size, generally the lesser the quality of the water permeate.

Preferred membranes for microfiltration are derived from poly(vinyl alcohol), polysulfone, polypropylene, nylon and the like, for example Zenon SJ. The same materials may be used to provide ultrafiltration membranes, for example a Zenon TAM membrane. The particular type and configuration of membrane filtration unit, whether spiral wound or tubular, is not narrowly critical. As an illustrative example, a 3.78 m$^3$ (1000 gal) bioreactor may be operatively connected with one or more multi-tube membrane units of commercially available Zenon Z8 modules with HSC or TAM membranes. Each such module contains eight (8) 1.83 m long tubes, each having a diameter of 2.22 cm, connected in series to provide a membrane area of 0.975 m$^2$/module. The modules themselves are connected in parallel with the concentrate recycle to the bioreactor. A liquid level control system maintains the reactor volume within desired limits.

The outlet pressure of the concentrate in line 32 is in the range from about 10 kPa to about 50 kPa lower than that in the inlet line 24 to a microfiltration unit; and, from about 50 kPa to 400 kPa lower than that in the inlet line to an ultrafiltration unit, depending upon the configuration of the membrane units.

The volume of permeate removed will depend upon the physical characteristics of the reaction mass as well as the specifications of the membrane. Typically the permeate will range from about 0.5% by volume or even less, to about 3% by volume of the incoming recycle stream flowing through inlet line 17. A portion of the permeate may be recycled (not shown) to the bioreactor, if desired, to maintain a balance between incoming feed to the membrane device and removed permeate.

Concentrate in conduit 24 is flowed inside the gas diffuser element 34 at a velocity of at least 1.5 m/sec, preferably in the range from 1.5–10 m/sec, so as to provide a shearing force along the inner surfaces of the diffuser element. Gas 32 enters the housing 35 of the micronizer 30 under pressure is diffused through micropores into the shearing liquid which generates mainly micron-sized bubbles 49 less than 10 $\mu$m in diameter, in the concentrate, forming a microaerated concentrate stream.

The kinetic energy of the gas stream is added to that of the shearing liquid to effect excellent mixing within the diffuser element. In large diffuser elements having a diameter in excess of about 10 cm, it may be desirable to provide mixing vanes to enhance mixing efficiency and ensure a substantially homogeneous mixture of separate gas and liquid phases in a fluid tail-jet.

The tail-jet is flowed through conduit 31 and enters below the surface of the activated sludge in the reactor. As shown, the tail-jet enters axially vertically, and is directed vertically downwards so that the tail-jet is diverted by the bottom of the bioreactor, symmetrically to the sides of the vessel 10, thus maintaining a generally vertical but looping recirculation pattern ("loops") viewed in elevation, the loops being generally mirror-images in each vertical half of the vessel, as illustrated by the arrows.

Figure 7:
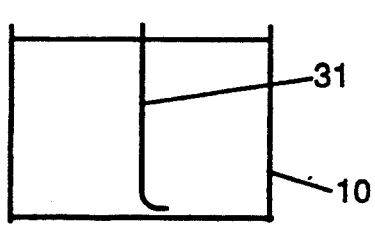
FIG. 7 is a schematic illustration of the bioreactor only, used in the system illustrated in FIG. 2, except that the tail-jet is introduced into the bioreactor along a wall, then discharged along the bottom of the reactor tangentially, so that the tail-jet is flowed around the circumference of the bottom of the bioreactor, generating a horizontal, circular pattern (in plan view).
Figure 8:
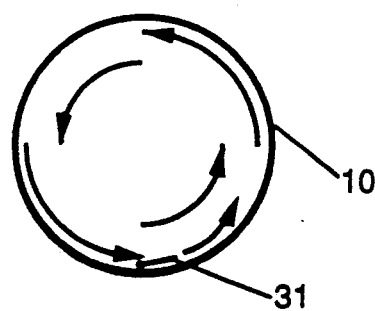
FIG. 8 is a plan view of the bioreactor shown in FIG. 7, schematically illustrating the circumferential flow pattern which is generated by discharging the tail-jet as shown in FIG. 2.

In a different operating mode, illustrated in FIGS. 7 and 8, the tail-jet is introduced along a reactor wall and flowed circumferentially near the bottom of the vessel. As the arrows illustrate, the recycle inlet 31' approaches the bottom of the vessel 10 and the tail-jet is discharged from the inlet so as to flow along the periphery of the bottom, near the inner surface of the vessel, thus generating a generally circular recirculation pattern, viewed in plan view, near the bottom.

Figure 9:
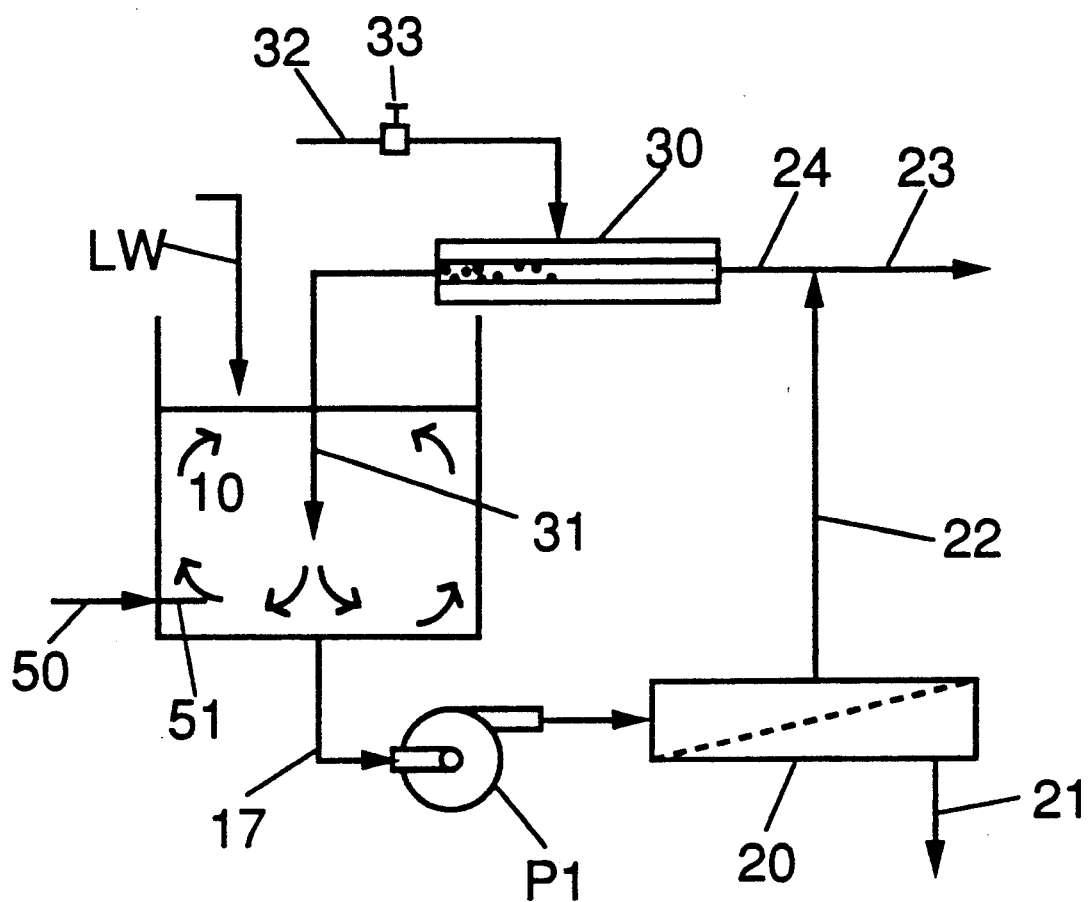
FIG. 9 is a schematic illustration of a modular shipboard MBR system, showing details of a second, more preferred embodiment comprising a single recycle loop containing the micronizer (referred to as a "micronizer loop"), and, in addition, a coarse bubble aerator which provides additional motive force to maintain continuous recirculation of solids.

In another embodiment, illustrated schematically in FIG. 9, the bioreactor 10 is operated with only the micronizer loop, the auxiliary aerator being a coarse bubble aerator which generates bubbles in a size range greater than those generated in a jet aerator. A conduit 50 provides air for a coarse bubble aerator 51, such as a PCI Hydro-Chek ® Air Diffuser. The air is flowed at relatively low pressure slightly above that required to overcome the hydrostatic head of activated sludge above the aerator 51, typically in the range from about 100 kPa to 170 kPa, at a flow rate sufficient to maintain a desirable recirculation pattern in the reactor, complementing the flow pattern attributable to the tail-jet 31. The advantage of the direct aerator without a second aeration loop is that the energy requirements are lower.

The aeration provided by the micronizer loop and the coarse bubble aerator, whether a jet aerator or a coarse bubble aerator, will change as a function of the loadings of the system, which in turn are a function of the number of people on board, and the volume of oily water, including bilge water discharged from the engine room.

EXAMPLES

An MBR system schematically illustrated in FIG. 9 was set up with a 100 L cylindrical bioreactor, about 1 meter in diam., in which the height of the liquid surface was about 50 cm (height=0.5 times diameter).

A synthetic feed was formulated to simulate the quality of a typical liquid waste stream of the combined black, grey and bilge water produced on a Cormorant class vessel (Canadian navy) carrying a crew in the range from 60 to 80 persons. The characteristics of the liquid waste (typical) for a crew of 80 is set forth in Table 1 below:

TABLE 1

|  | Typical |
|---|---|
| No. of crew | 80 |
| Flow (L/capita/day) | 137 |
| Total flow (L/day) | 11020 |
| BOD5 (mg/L) | 967 |
| TSS* (mg/L) | 642 |

*total suspended solids

The synthetic feed was formulated for the typical liquid waste with a mixture of milk powder, fish meal, instant mashed potato mix, urea, detergent, vegetable oil, mineral oil, lard, body soap, dish soap, hair and toilet paper.

The synthetic feed was used in a 100 L reactor under the same conditions of operation as if the reactor was 3000 L, and the auxiliary stream 50 was only air. The conditions for operation for the pilot 100 L reactor run as if it was 3000 L, are given in the first column in the Table 2 below.

The synthetic feed was also used in the 100 L reactor operated as if there was space for no more than a 1500 L reactor aboard the vessel. To maintain such operation, the air stream 50 was replaced with a stream of pure oxygen. The conditions for operation for the pilot 100 L reactor run as if it was 1500 L, are given in the second column in the Table 2 below.

TABLE 2

| Reactor operated as: | 3000 L | 1500 L |
|---|---|---|
| Feed flow, L/min | 0.295 | 0.513 |
| HRT, hr | 6.5 | 3.2 |
| Feed COD, mg/L | 2307 | 2236 |
| Feed BOD5, mg/l | 1130 | 1095 |
| Feed TSS, mg/l | 796 | 792 |
| Volumetric COD load, kg/m$^3$/day | 8.52 | 16.52 |
| Volumetric BOD5 load, kg/m$^3$/day | 4.17 | 8.09 |
| Volumetric TSS load, kg/m$^3$/day | 2.94 | 5.85 |
| F/M*, kg BOD5/kg/day | 0.17 | 0.32 |
| Temperature, °C. | 35 | 40 |
| pH | 7.6 | 7.7 |

*F/M = feed supplied/unit weight of microorganisms/day

The above operating conditions show that the F/M, COD, BOD5 and TSS are each approximately double for treatment of the liquid waste in a 1500 L reactor. Clearly, in the 1500 L reactor the HRT will be about one-half the HRT in the 3000 L reactor since the same feed is being treated in one-half the volume. In a practical reactor on-board a vessel, the HRT during operation at peak load will be less than 16 hr, preferably less than 10 hr.

The conditions of operation of a TAM UF membrane and the fluxes obtained over a period of 62 days, are summarized herebelow in Table 3.

TABLE 3

|  | TAM* |
|---|---|
| Total No. of days | 62 |
| Avg. inlet press., psi | 58.4 |
| Avg. outlet press., psi | 19.9 |
| Avg. P, psi | 38 |
| Avg. avg. press., psi | 39.2 |
| Est. avg. conc. flow, gpm | 21 |
| Avg. bioreactor TS, g/L | 23.49 |
| Avg. Temp., °C. | 36.7 |
| Avg. Flux, gfd | 32.5 |
| Avg. Flux @ 40° C., gfd | 35.1 |

*UF membrane

Data for the effluent obtained for operation with air under simulated conditions for the 3000 L reactor are set forth in Table 4 below.

TABLE 4

|  | Feed | Permeate | Removal |
|---|---|---|---|
| COD, mg/L | 2307 | 79 | 96.6% |
| BOD5, mg/L | 1130 | <5 | 99.6% |
| TFO & G*, mg/L | 43 | 3 | 93.0% |
| TSS, mg/L | 796 | <1 | 99.9% |

*total fat, oil and grease

Data for the effluent obtained for operation with oxygen under simulated conditions for the 1500 L reactor are set forth in Table 5 below.

TABLE 5

|  | Feed | Permeate | Removal |
|---|---|---|---|
| COD, mg/L | 2236 | 159 | 92.9% |
| BOD5, mg/L | 1095 | 35 | 96.8% |
| TFO & G*, mg/L | 45 | 5 | 88.3% |
| TSS, mg/L | 792 | 1 | 99.9% |

It is evident from the foregoing that, operation of the reactor in either mode, whether with air, or with oxygen, a feed with a COD more than twice as high as that run in a conventional "high-rate" reactor, produces an excellent permeate.

A comparison of the HRTs obtained with a 3000 L reactor run as a "high-rate" reactor with a mixed liquor suspended solids (MLSS) of 10 g/L, and a 3000 L MBR, operated with air (not oxygen-enriched air) are set forth in Table 6 below. Better results will be obtained with oxygen-enriched air which may be produced on-board ship by a membrane separation process (to avoid storing pure oxygen), if desired.

TABLE 6

|  | High-Rate | MBR |
|---|---|---|
| MLSS, g/L | 10 | 25 |
| F/M, kg BOD/kg MLVSS/day | 1.5 | 0.15 |
| Volumetric loading, kg BOD/m³/day | 1.6 | 4.2 |
| HRT, hr | 0.5 | 6.5 |

The effectiveness of the MBR system is clearly demonstrated.

Having thus provided a general discussion, described the overall process in detail, and illustrated the invention with specific examples of the best mode of carrying out the process, it will be evident that the invention has provided an effective solution to a difficult problem. It is therefore to be understood that no undue restrictions are to be imposed by reason of the specific embodiments illustrated and discussed, except as provided by the following claims.

I claim:

1. A process for treating organic liquid waste generated on-board a host marine vessel, utilizing a membrane-bioreactor system, said process comprising, (a) feeding an aqueous suspension of said liquid waste comprising black water, grey water, and oily water to a bioreaction zone containing live microorganisms adapted to digest said liquid waste;

(b) flowing activated sludge withdrawn from said bioreaction zone, to a membrane filtration zone at a velocity and pressure sufficient to maintain a predetermined membrane flux in said zone, at which flux essentially no solids are retained on the surface of said membrane having a predetermined molecular cut-off which will permit passage of only molecules smaller than 500,000 Daltons;

(c) separating water which is essentially solids-free, as a permeate, from a solids-containing concentrate, and removing the permeate from said membrane filtration zone;

(d) flowing said concentrate from said membrane filtration zone into a gas micronizing zone comprising a microporous air diffuser element without introducing additional energy into said concentrate until it is introduced into said micronizing zone;

(e) introducing said concentrate axially into said micronizing zone, while discharging into said zone a gas containing at least about 20% oxygen under pressure in the range from about 150 kPa to about 1000 kPa so as to incorporate micronized gas bubbles having an average diameter in the range from about 1 $\mu$m to about 1000 $\mu$m into said concentrate, forming a microaerated concentrate having separate gas and liquid phases;

(f) directly flowing a continuous stream of the microaerated concentrate from said micronizing zone into said bioreaction zone without introducing any additional energy into the microaerated concentrate after it leaves said micronizing zone;

(g) introducing a first tail-jet of said microaerated concentrate below the surface of liquid in the reactor to establish a recycle loop in said bioreaction zone;

(h) flowing an auxiliary stream of air in the form of coarse bubbles greater than about 2 mm in diameter, with enough energy to maintain a desirable recirculation pattern in said reaction zone; and, at the same time, directing said first tail-jet into said bioreaction zone so as to maintain an average liquid velocity of at least 03. meter/sec within said bioreaction zone while also maintaining said recirculation pattern therein; whereby an adequate hydraulic retention time, based on flow of said liquid waste, and solids retention time is obtained to retain soluble organics greater than said molecular weight cut-off in said reaction zone for a period at least 10 times longer than the hydraulic retention time based on liquid waste flow.

2. The process of claim 1, including continuously introducing said aqueous suspension into said bioreaction zone in which microorganisms ar present in an amount more than 10 g/L.

3. The process of claim 2 including withdrawing a bleed stream of said concentrate from said recycle loop prior to introducing said concentrate into said micronizing zone so as to modulate the concentration of solids in said aqueous suspension.

4. The process of claim 3 wherein said concentrate is introduced into said micronizing zone at a velocity of at least about 1.5 meters/sec, and including, maintaining pH of said aqueous suspension in said bioreaction zone in the range from about 6 to 7.

5. The process of claim 4 wherein said microaerated concentrate provides an oxygen transfer into said aqueous suspension in said bioreaction zone, of at least 500 mg/liter/hr, and said permeate has a BOD (biological oxygen demand) <50 mg/L; suspended solids (water-insoluble) <50 mg/L; and oil and grease <15 mg/L.

6. The process of claim 5 wherein said recycle loop provides a power efficiency for said membrane-bioreactor system of at least 0.9 Kg O$_2$/kWh; bubbles in said microaerated concentrate are in the range from 1 $\mu$m to 1000 $\mu$m in diameter; and, said membrane filtration zone contains a membrane having a pore size in the range from about 0.001 $\mu$m–0.5 $\mu$m having a clean water flux, measured at 20° C. and 370 kPa, of at least 10 m³/m²/day.

7. The process of claim 4 wherein said micronizing zone is generally cylindrical in shape, said concentrate is introduced longitudinally axially into said micronizing zone and said gas is introduced radially therein, passing through pores from 1–100 $\mu$m in diameter in said diffuser element and into said concentrate.

8. The process of claim 4 wherein said micronizing zone is generally cylindrical in shape, said concentrate is introduced radially into said micronizing zone and travels longitudinally axially therein, said gas is introduced longitudinally axially therein, passing radially outwardly through pores from 1–100 $\mu$m in diameter in said diffuser element and into said concentrate.

9. A treatment system for liquid waste generated aboard a host marine vessel, said system to be connected between an inlet for said liquid waste, and, an outlet for treated effluent, comprising, (a) a bioreactor constructed and arranged to operate essentially continuously while maintaining a predetermined level of activated sludge within said bioreactor, with means for receiving said liquid waste to be contacted with waste-degrading microorganisms agglomerated as solids mixed in said waste, said bioreactor preferably being no higher than it is wide;

(b) pump means for withdrawing a suspension of said solids from said bioreactor, and pumping said suspension at elevated pressure through a discharge line;

(c) membrane filtration means in fluid communication with said pump means, said membrane filtration means including plural membrane element means for separating said suspended solids in a concentrate stream from water permeate which is essentially free of solids, and means to duct said permeate away from said system;

(d) a gas micronizing means, exteriorly disposed relative to said bioreactor and in direct open-flow communication with said concentrate stream from said filtration means, in fluid communication with said filtration means;

(e) auxiliary aeration means providing motive force with relatively coarse bubbles greater than about 2 mm in diameter introduced below the surface of said bioreactor to establish a recirculation pattern;

said gas micronizing means comprising, (i) a tubular microporous body coaxially housed in a housing means for containing gas under elevated pressure, and contacting said gas with said concentrate stream; (ii) inlet means for said gas; and, (iii) inlet and outlet means for the concentrate stream to be flowed through the gas micronizing means; control means on inlet means to modulate the flow of oxygen to said gas micronizing means, in an amount proportional to the residual dissolved oxygen ("DO") concentration; and, conduit means directly placing said outlet means from said micronizing means in open fluid communication with said wastewater in said bioreactor, said conduit means having a tail-jet outlet means for discharging a tail-jet of mixed gas and liquid phases below the surface of said wastewater;

said aerator means comprising a macroporous element through which air is flowed at a velocity sufficient to generate a chosen pattern of recirculation in said bioreactor while maintaining a liquid velocity of at least 0.3 meter/sec within said bioreactor.

10. The treatment system of claim 9 wherein said membrane filtration means is an ultrafiltration membrane having a pore size in the range from 0.05 $\mu$m to 0.5 $\mu$m.

11. The treatment system of claim 9 wherein said inlet means for said gas is in said housing, and said inlet and outlet means for said concentrate stream are in open communication with said upstream and downstream ends, respectively, of said microporous element.

12. The treatment system of claim 9 wherein said inlet means for said gas is in open communication with said upstream end of said element, and said inlet and outlet means for said concentrate stream are in open communication with said housing.

13. In a continuous biodegradation process carried out in a marine host vessel, said process using live microorganisms in an aqueous environment to oxidize dissolved or suspended organic material in a bioreaction zone wherein biomass is aerated, and a portion of said biomass is withdrawn for circulation through a membranous filtration zone from which a permeate of high quality water is continuously withdrawn, and the remaining solids-containing concentrate is recycled to said bioreaction zone; said solids-containing concentrate is flowed into a micronizing zone comprising a microporous diffuser element externally disposed relative to said bioreaction zone, said solids-containing concentrate in said micronizing zone is contacted with an oxygen-containing gas at a pressure in the range from about 150–1000 kPa so as to microaerate said concentrate infusing it with a multiplicity of gas bubbles in the range from 1–1000 $\mu$m in diameter, and adding the energy of said gas to the kinetic energy of said solids-containing stream so as to provide a tail-jet leaving said micronizing zone; and, said tail-jet is introduced with sufficient motive force to establish a desired recirculation pattern of solids in said biomass, said motive force being provided by the sum of the energies in said solids-containing stream and said gas stream; the improvement comprising, (a) combining black water, grey water, and oily water generated on board said host vessel into a liquid waste stream; and, (b) flowing an auxiliary stream of air in the form of coarse bubbles greater than about 2 mm in diameter with enough energy to maintain a desirable recirculation pattern in said reaction zone; whereby activated sludge solids are separated only after flowing said biomass through said membranous filtration zone.

14. The process of claim 13 including withdrawing a bleed stream of said concentrate from said recycle loop prior to introducing said concentrate into said micronizing zone so as to modulate the concentration of solids in said suspension.

15. The process of claim 14 wherein recycling said solids-containing concentrate through said micronizing zone provides a power efficiency for said membrane-bioreactor system, of at least 0.9 Kg $O_2$/kWh.

16. The process of claim 15 wherein the ratio of (oily water):(black water):(grey water) in said liquid waste stream is in the range from 1:1:4 to 1:1:8.

17. The process of claim 13 wherein said concentrate is introduced into said micronizing zone at a velocity of at least about 1.5 meters/sec.

18. The process of claim 13 wherein said tail-jet provides an oxygen transfer into said aqueous suspension in said bioreaction zone of at least 500 mg/liter/hr.

19. The process of claim 13 wherein said micronizing zone is generally cylindrical in shape, said concentrate is introduced longitudinally axially into said micronizing zone and said gas is introduced radially therein, passing through pores from 1–100 $\mu$m in diameter in said diffuser element and into said concentrate.

20. The process of claim 13 wherein said micronizing zone is generally cylindrical in shape, said concentrate is introduced radially into said micronizing zone and travels longitudinally axially therein, said gas is introduced longitudinally axially therein, passing radially outwardly through pores from 1–100 $\mu$m in diameter in said diffuser element and into said concentrate.

* * * * *